(12) United States Patent
Zaitsev et al.

(10) Patent No.: US 7,530,106 B1
(45) Date of Patent: May 5, 2009

(54) SYSTEM AND METHOD FOR SECURITY RATING OF COMPUTER PROCESSES

(75) Inventors: Oleg V. Zaitsev, Moscow (RU); Nikolay A. Grebennikov, Moscow (RU); Alexey V. Monastyrsky, Moscow (RU); Mikhail A. Pavlyushchik, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 12/167,138

(22) Filed: Jul. 2, 2008

(51) Int. Cl.
*G06F 11/00* (2006.01)
(52) U.S. Cl. .............................. 726/24; 726/22; 726/23; 713/164; 713/165; 713/187; 713/188
(58) Field of Classification Search ................... 726/22, 726/23, 24; 713/164, 165, 187, 188
See application file for complete search history.

(56) References Cited

U.S. PATENT DOCUMENTS

| | | | |
|---|---|---|---|
| 3,798,605 A | 3/1974 | Feistel | |
| 4,003,033 A | 1/1977 | O'Keefe et al. | |
| 4,017,839 A | 4/1977 | Calle et al. | |
| 4,047,158 A | 9/1977 | Jennings | |
| 4,065,117 A | 12/1977 | Thorsheim | |
| 4,084,224 A | 4/1978 | Appell et al. | |
| 4,084,228 A | 4/1978 | Dufond et al. | |
| 4,104,718 A | 8/1978 | Poublan et al. | |
| 4,104,721 A | 8/1978 | Markstein et al. | |
| 4,118,789 A | 10/1978 | Casto et al. | |
| 4,135,240 A | 1/1979 | Ritchie | |
| 4,215,407 A | 7/1980 | Gomola et al. | |
| 4,218,738 A | 8/1980 | Matyas et al. | |
| 4,249,241 A | 2/1981 | Aberle et al. | |
| 4,262,329 A | 4/1981 | Bright et al. | |

(Continued)

FOREIGN PATENT DOCUMENTS

DE 4123126 C1 6/1992

(Continued)

OTHER PUBLICATIONS

DoD 5200.28-STD Trusted Computer System Evaluation Criteria R. C. Summers An Overview of Computer Security Clark and Wilson Comparison of Commercial and Military Computer Security Policies Landwehr Best Available Technologies for Computer Security Landwehr Formal Models for Computer Security.

(Continued)

*Primary Examiner*—David Garcia Cervetti
(74) *Attorney, Agent, or Firm*—Bardmesser Law Group (57) ABSTRACT

A system, method, and computer program product for secure rating of processes in an executable file for malware presence comprising: (a) detecting an attempt to execute a file on a computer; (b) performing an initial risk assessment of the file; (c) starting a process from code in the file; (d) analyzing an initial risk pertaining to the process and assigning an initial security rating to the process; (e) monitoring the process for the suspicious activities; (f) updating the security rating of the process when the process attempts to perform the suspicious activity; (g) if the updated security rating exceeds a first threshold, notifying a user and continuing execution of the process; and (h) if the updated security rating exceeds a second threshold, blocking the action and terminating the process.

19 Claims, 3 Drawing Sheets

U.S. PATENT DOCUMENTS

| | | |
|---|---|---|
| 4,296,464 A | 10/1981 | Woods et al. |
| 4,301,486 A | 11/1981 | Brown et al. |
| 4,310,720 A | 1/1982 | Check, Jr. |
| 4,328,542 A | 5/1982 | Anastas et al. |
| 4,366,537 A | 12/1982 | Heller et al. |
| 4,375,579 A | 3/1983 | Davida et al. |
| 4,386,233 A | 5/1983 | Smid et al. |
| 4,430,728 A | 2/1984 | Beitel et al. |
| 4,432,051 A | 2/1984 | Bogaert et al. |
| 4,445,177 A | 4/1984 | Bratt et al. |
| 4,454,594 A | 6/1984 | Heffron et al. |
| 4,456,954 A | 6/1984 | Bullions, III et al. |
| 4,458,315 A | 7/1984 | Uchenick |
| 4,471,163 A | 9/1984 | Donald et al. |
| 4,493,023 A | 1/1985 | Gavrin et al. |
| 4,500,750 A | 2/1985 | Elander et al. |
| 4,533,996 A | 8/1985 | Hartung et al. |
| 4,543,082 A | 9/1985 | Stenner |
| 4,553,263 A | 11/1985 | Smith et al. |
| 4,573,119 A | 2/1986 | Westheimer et al. |
| 4,574,350 A | 3/1986 | Starr |
| 4,580,217 A | 4/1986 | Celio |
| 4,584,639 A | 4/1986 | Hardy |
| 4,599,489 A | 7/1986 | Cargile |
| 4,638,356 A | 1/1987 | Frezza |
| 4,651,920 A | 3/1987 | Stenner |
| 4,652,990 A | 3/1987 | Pailen et al. |
| 4,677,546 A | 6/1987 | Freeman |
| 4,688,169 A | 8/1987 | Joshi |
| 4,716,528 A | 12/1987 | Crus et al. |
| 4,722,049 A | 1/1988 | Lahti |
| 4,733,345 A | 3/1988 | Anderson |
| 4,742,215 A | 5/1988 | Daughters et al. |
| 4,780,821 A | 10/1988 | Crossley |
| 4,815,031 A | 3/1989 | Furukawa |
| 4,819,159 A | 4/1989 | Shipley et al. |
| 4,858,117 A | 8/1989 | DiChiara et al. |
| 4,864,494 A | 9/1989 | Kobus, Jr. |
| 4,868,877 A | 9/1989 | Fischer |
| 4,891,503 A | 1/1990 | Jewell |
| 4,891,838 A | 1/1990 | Faber |
| 4,916,624 A | 4/1990 | Collins et al. |
| 4,919,545 A | 4/1990 | Yu |
| 4,937,863 A | 6/1990 | Robert et al. |
| 4,941,175 A | 7/1990 | Enescu et al. |
| 4,957,311 A | 9/1990 | Geisenheimer |
| 4,959,861 A | 9/1990 | Howlette |
| 4,967,377 A | 10/1990 | Masuda |
| 4,969,136 A | 11/1990 | Chamberlin et al. |
| 4,975,950 A | 12/1990 | Lentz |
| 4,979,098 A | 12/1990 | Baum et al. |
| 5,005,200 A | 4/1991 | Fischer |
| 5,012,514 A | 4/1991 | Renton |
| 5,023,773 A | 6/1991 | Baum et al. |
| 5,043,878 A | 8/1991 | Ooi |
| 5,050,078 A | 9/1991 | Sansone |
| 5,060,135 A | 10/1991 | Levine et al. |
| 5,065,429 A | 11/1991 | Lang |
| 5,077,654 A | 12/1991 | Ohtsuki |
| 5,093,914 A | 3/1992 | Coplien et al. |
| 5,117,458 A | 5/1992 | Takaragi et al. |
| 5,124,937 A | 6/1992 | Uchiike et al. |
| 5,133,070 A | 7/1992 | Barker et al. |
| 5,140,684 A | 8/1992 | Sakamura et al. |
| 5,142,578 A | 8/1992 | Matyas et al. |
| 5,144,557 A | 9/1992 | Wang et al. |
| 5,144,659 A | 9/1992 | Jones |
| 5,146,575 A | 9/1992 | Nolan, Jr. |
| 5,148,481 A | 9/1992 | Abraham et al. |
| 5,163,097 A | 11/1992 | Pegg |
| 5,173,939 A | 12/1992 | Abadi et al. |
| 5,175,851 A | 12/1992 | Johnson et al. |
| 5,175,852 A | 12/1992 | Johnson et al. |
| 5,182,770 A | 1/1993 | Medveczky et al. |
| 5,204,961 A | 4/1993 | Barlow |
| 5,204,966 A | 4/1993 | Wittenberg et al. |
| 5,210,795 A | 5/1993 | Lipner et al. |
| 5,220,603 A | 6/1993 | Parker |
| 5,220,604 A | 6/1993 | Gasser et al. |
| 5,220,669 A | 6/1993 | Baum et al. |
| 5,224,160 A | 6/1993 | Paulini et al. |
| 5,224,163 A | 6/1993 | Gasser et al. |
| 5,230,069 A | 7/1993 | Brelsford et al. |
| 5,249,290 A | 9/1993 | Heizer |
| 5,263,157 A | 11/1993 | Janis |
| 5,265,163 A | 11/1993 | Golding et al. |
| 5,265,164 A | 11/1993 | Matyas et al. |
| 5,272,754 A | 12/1993 | Boerbert |
| 5,276,444 A | 1/1994 | McNair |
| 5,276,735 A | 1/1994 | Boerbert et al. |
| 5,276,901 A | 1/1994 | Howell et al. |
| 5,283,830 A | 2/1994 | Hinsley et al. |
| 5,291,596 A | 3/1994 | Mita |
| 5,301,234 A | 4/1994 | Mazziotto et al. |
| 5,303,360 A | 4/1994 | Hilton et al. |
| 5,311,591 A | 5/1994 | Fischer |
| 5,311,593 A | 5/1994 | Carmi |
| 5,313,521 A | 5/1994 | Torii et al. |
| 5,313,637 A | 5/1994 | Rose |
| 5,315,657 A | 5/1994 | Abadi et al. |
| 5,339,403 A | 8/1994 | Parker |
| 5,379,433 A | 1/1995 | Yamagishi |
| 5,388,156 A | 2/1995 | Blackledge, Jr. et al. |
| 5,388,211 A | 2/1995 | Hornbuckle |
| 5,390,312 A | 2/1995 | Chiarot et al. |
| 5,396,609 A | 3/1995 | Schmidt et al. |
| 5,408,642 A | 4/1995 | Mann |
| 5,412,717 A | 5/1995 | Fischer |
| 5,475,839 A | 12/1995 | Watson et al. |
| 5,485,409 A | 1/1996 | Gupta et al. |
| 5,537,099 A | 7/1996 | Liang |
| 5,560,008 A | 9/1996 | Johnson et al. |
| 5,574,936 A | 11/1996 | Ryba et al. |
| 5,577,209 A | 11/1996 | Boyle et al. |
| 5,581,763 A | 12/1996 | Hait |
| 5,642,515 A | 6/1997 | Jones et al. |
| 5,671,367 A | 9/1997 | Le Roux |
| 5,745,879 A | 4/1998 | Wyman |
| 5,812,763 A | 9/1998 | Teng |
| 5,903,721 A | 5/1999 | Sixtus |
| 6,134,324 A | 10/2000 | Bohannon et al. |
| 6,507,909 B1 | 1/2003 | Zurko et al. |
| 6,931,540 B1* | 8/2005 | Edwards et al. ............ 713/188 |
| 6,973,578 B1* | 12/2005 | McIchione .................. 726/24 |
| 7,065,657 B1* | 6/2006 | Moran ........................ 726/5 |
| 7,188,368 B2* | 3/2007 | Swimmer et al. ............ 726/24 |
| 7,203,962 B1* | 4/2007 | Moran ........................ 726/23 |
| 7,251,830 B1* | 7/2007 | Melchione .................. 726/24 |
| 7,281,267 B2* | 10/2007 | Tarbotton et al. ........... 726/22 |
| 7,383,581 B1* | 6/2008 | Moore et al. ................ 726/24 |
| 7,392,541 B2* | 6/2008 | Largman et al. ............ 726/17 |
| 7,415,726 B2* | 8/2008 | Kelly et al. .................. 726/24 |
| 2002/0116627 A1* | 8/2002 | Tarbotton et al. ........... 713/200 |
| 2002/0174010 A1* | 11/2002 | Rice, III .................... 705/14 |
| 2003/0088680 A1* | 5/2003 | Nachenberg et al. ........ 709/229 |
| 2004/0025015 A1* | 2/2004 | Satterlee et al. ............ 713/164 |
| 2004/0073617 A1* | 4/2004 | Milliken et al. ............ 709/206 |
| 2005/0120237 A1* | 6/2005 | Roux et al. ................ 713/200 |
| 2005/0138110 A1* | 6/2005 | Redlich et al. ............. 709/201 |
| 2005/0223239 A1* | 10/2005 | Dotan ....................... 713/188 |
| 2005/0257265 A1* | 11/2005 | Cook et al. ................. 726/23 |
| 2005/0257266 A1* | 11/2005 | Cook et al. ................. 726/23 |
| 2006/0031937 A1* | 2/2006 | Steinberg .................. 726/24 |
| 2006/0031940 A1* | 2/2006 | Rozman et al. ............. 726/27 |

| | | | | |
|---|---|---|---|---|
| 2006/0236392 | A1* | 10/2006 | Thomas et al. | 726/23 |
| 2006/0272021 | A1* | 11/2006 | Marinescu et al. | 726/24 |
| 2006/0288416 | A1* | 12/2006 | Costea et al. | 726/24 |
| 2007/0006304 | A1* | 1/2007 | Kramer et al. | 726/22 |
| 2007/0028291 | A1* | 2/2007 | Brennan et al. | 726/1 |
| 2007/0143827 | A1* | 6/2007 | Nicodemus et al. | 726/2 |
| 2007/0143851 | A1* | 6/2007 | Nicodemus et al. | 726/25 |
| 2007/0157315 | A1* | 7/2007 | Moran | 726/23 |
| 2007/0180509 | A1* | 8/2007 | Swartz et al. | 726/9 |
| 2007/0260643 | A1* | 11/2007 | Borden et al. | 707/201 |
| 2008/0005796 | A1* | 1/2008 | Godwood et al. | 726/24 |
| 2008/0256075 | A1* | 10/2008 | Claus et al. | 707/9 |
| 2008/0256076 | A1* | 10/2008 | Claus et al. | 707/9 |
| 2009/0031129 | A1* | 1/2009 | Milliken et al. | 713/168 |
| 2009/0031136 | A1* | 1/2009 | Milliken et al. | 713/176 |
| 2009/0038011 | A1* | 2/2009 | Nadathur | 726/24 |

FOREIGN PATENT DOCUMENTS

| | | |
|---|---|---|
| EP | 79133 A2 | 5/1983 |
| EP | 187603 A2 | 7/1986 |
| EP | 235615 A2 | 9/1987 |
| EP | 0398645 | 5/1990 |
| EP | 456386 B1 | 11/1991 |
| EP | 470163 A1 | 2/1992 |
| EP | 503765 B1 | 9/1992 |
| GB | 1142565 | 2/1969 |
| GB | 1154387 | 6/1969 |
| GB | 1539356 | 1/1979 |
| GB | 1585960 | 3/1981 |
| JP | 55116155 | 9/1980 |
| JP | 3088052 | 4/1991 |
| JP | 4119442 | 4/1992 |
| JP | 5088960 | 4/1993 |
| JP | 5094357 | 4/1993 |
| JP | 5151088 | 6/1993 |
| JP | 5224828 | 9/1993 |
| WO | WO 89/03092 A1 | 4/1989 |

OTHER PUBLICATIONS

"Computer Security Basics" Deborah Russell G. T. Gangemi O'Reilly 1991 (http://www.google.com/books?id=BtB1aBmLuLEC&printsec=frontcover&hl=ru#PPA117M1).

Administrative Role Configuration with Privilege Control Lists Декабрь1991 pp. 110-113 (https://www.delphion.com/tdbs/tdb?order=91A+63266).

Extensible Access Control List Mechanism Декабрь1991 pp. 114-117 (https://www.delphion.com/tdbs/tdb?order=91A+63267).

Стандарт "Department of Defense Trusted Computer System Evaluation Criteria" (http://www.iwar.org.uk/comsec/resources/standards/rainbow/5200.28-STD.html) Екабрьинформация о стандарте: http://en.wikipedia.org/wiki/Trusted_Computer_System_Evaluation_Criteria.

IBM system journal 1984 (http://www.research.ibm.com/journal/sj/234/ibmsj2304C.pdf).

IBM TDB (Technical Disclosure Bulletin) Dec. 1991 pp. 477-479 (https://www.delphion.com/tdbs/tdb?order=91A+63399).

Arnold W.C et al. "Automated Program Analysis lor Computer Virus Detection" IBM Technical Disclosure Bulletin Yorktown pp. 415-416 (Jul. 1991).

Benignus D.M. and Kamer F.A. "Configuration Table and Record for Use in a Diagnostic Expert System", IBM Technical Disclosure Bulletin Austin pp. 4091-4092 (Feb. 1986).

Camillone N.A. et al. "Extensible Access Control List Mechanism" IBM Technical Disclosure Bulletin Austin pp. 114-117 (Dec. 1991).

Comerford L.D. and Strohm W.D. "Artifical Immunity for Personal Computers" IBM Technical Disclosure Bulletin, Yorktown, pp. 150-154 (Jul. 1991).

Department of Defense "Department of Defense Trusted Computer System Evaluation Criteria" DOD 5200.28-STD (Dec. 26, 1985).

Jones J.E. et al. "User Interface to Test Cases for Testing a Virtual Resource Manager," IBM Technical Disclosure Bulletin, Austin, pp. 4007-4010 (Feb. 1987).

Landwehr C.E. "Formal Models for Computer Security" Computing Surveys, vol. 13(3):247-278 (Sep. 1981).

Langford J.S. et al. "Administrative Role Configuration with Privilege Control Lists" IBM Technical Disclosure Bulletin Austin pp. 110-113 (Dec. 1991).

Langford J.S. et al. "Privilege Control Mechanism for UNIX Systems" IBM Technical Disclosure Bulletin, Austin, pp. 477-479 (Dec. 1991).

Steves D.H. and Witte K.C. "Trojan Horse and Virus Detection Using Real Time Auditing" IBM Technical Disclosure Bulletin, Austin, pp. 78-81 (Dec. 1991).

Summers R.C. "An Overview of Computer Security," IBM Systems Journal, vol. 23(4):309-235 (1984).

Wimer T.L. "Initiation and Execution Controls of Diagnostic Microprograms for Data Processor," IBM Technical Disclosure Bulletin, San Jose, p. 1793 (Nov. 1972).

* cited by examiner

SYSTEM AND METHOD FOR SECURITY RATING OF COMPUTER PROCESSES

BACKGROUND OF THE INVENTION

1. Field of the Invention

The present invention is related to anti-malware technology, and more particularly, to measuring a static and dynamic security rating of processes.

2. Description of the Related Art

Detection of viruses has been a concern throughout the era of the personal computer. With the growth of communication networks, such as the Internet, and increasing interchange of data, including the rapid growth in the use of e-mail for communications, the infection of computers through communications or file exchange is an increasingly significant consideration. Infections take various forms, but are typically related to computer viruses, trojan programs, or other forms of malicious code. Recent incidents of e-mail mediated virus attacks have been dramatic both for the speed of propagation and for the extent of damage, with Internet service providers (ISPs) and companies suffering service problems and a loss of e-mail capability. In many instances, attempts to adequately prevent file exchange or e-mail mediated infections significantly inconvenience computer users. Improved strategies for detecting and dealing with virus attacks are desired.

One conventional technique for detecting viruses is signature scanning. Signature scanning systems use sample code patterns extracted from known malicious code and scan for the occurrence of these patterns in other program code. In some cases, program code that is scanned is first decrypted through emulation, and the resulting code scanned for virus signatures or function signatures. A primary limitation of this signature scanning method is that only known malicious code is detected, that is, only code that matches the stored sample signatures of known malicious code is identified as infected. All the viruses or malicious code not previously identified and all the viruses or malicious code created after the last update of the signature database will not be detected. Thus, newly released viruses are not detected by this method; neither are viruses with code in which the signature, previously extracted and contained in the signature database, has been overwritten.

In addition, the signature analysis fails to identify the presence of a virus if the signature is not aligned in the code in the expected fashion. Alternatively, the authors of a virus may obscure the identity of the virus by opcode substitution or by inserting dummy or random code into virus functions. Nonsense code can be inserted that alters the signature of the virus to a sufficient extent undetectable by a signature scanning program, without diminishing the ability of the virus to propagate and deliver its payload.

Another virus detection strategy is integrity checking. Integrity checking systems extract a code sample from known benign application program code. The code sample is stored, together with information from the program file, such as the executable program header and the file length, as well as the date and time of the sample. The program file is checked at regular intervals against this database to ensure that the program file has not been modified. Integrity checking programs generate long lists of modified files when a user upgrades the operating system of the computer or installs or upgrades application software. The main disadvantage of an integrity check-based virus detection system is that many warnings of virus activity are issued when any modification of an application program is performed. It is difficult for a user to determine whether a warning represents a legitimate attack on the computer system.

Checksum monitoring systems detect viruses by generating a cyclic redundancy check (CRC) value for each program file. Modification of the program file is detected by a variation in the CRC value. Checksum monitors improve on integrity check systems since it becomes difficult for malicious code to defeat the monitoring. On the other hand checksum monitors exhibit the same limitations as integrity checking systems, meaning that false warnings are issued, and it becomes difficult to identify which warnings represent actual viruses or infection.

Behavior interception systems detect virus activity by interacting with the operating system of the target computer and monitoring for potentially malicious behavior. When malicious behavior is detected, the action is blocked and the user is informed that a potentially dangerous action is about to take place. The potentially malicious code can be allowed to perform this action by the user, which makes the behavior interception system somewhat unreliable, because the effectiveness of the system depends on the user input. In addition, resident behavior interception systems are sometimes detected and disabled by malicious code.

Another conventional strategy for detecting infections is the use of bait files. This strategy is typically used in combination with various virus detection strategies to detect an existing and active infection. This means that the malicious code is running on the target computer and is modifying files. The virus is detected the moment the bait file is modified. Many viruses are aware of bait files and do not modify files that are either too small or have a predetermined content in the file name or because of their structure.

One of the problems in the field of anti-virus software is the fact that many users are unwilling to wait for a long time for the anti-virus software to do its work. In fact, most users would wait a fraction of a second, perhaps a second or two, when starting an application, but not longer than that. On the other hand in such a relatively short period of time, only more rudimentary anti-virus checks are possible, which is problem for the anti-virus software vendor, because the need to check the executable file being launched for viruses must be balanced against the time that a thorough anti-virus check takes.

It is apparent that improved techniques for detecting viruses and other malicious types of code are desirable.

SUMMARY OF THE INVENTION

The present invention is intended as a system and a method for security rating of processes that substantially obviates one or several of the disadvantages of the related art.

In one aspect of the invention there is provided a system, method, and computer program product for security rating of processes for malware presence, including (a) detecting an attempt to execute a file on a computer; (b) performing initial risk assessment of the file and assigning initial (static) security rating S; (c) analyzing the initial risk pertaining to the file and if it exceeds predetermined threshold, notifying user; (d) starting the process from code in the file; (e) continuing to monitor the process for any suspicious activities; (f) once the process executed a suspicious operation, the security rating dynamically changes to D; (g) if the security rating D is, for example, 50% or less the system will continue to execute the process; (h) if the security rating D is greater than, for example, 50% then the user gets notified and the process most likely will continued to be executed, unless the user instructs otherwise; (i) if the security rating D is, for example, 75% or less, the system will notify the user and depending on the user response probably will continue the process execution, but restricting access to most of computer resources; (j) if the security rating D is greater than 75% then the system will block the actions of the process; (k) the system will terminate the process, optionally notify the user, and cure the process; (l) after the process has been terminated the system has to deal with the corrupted file; (m) if the corrupted file is a system component or a 'useful' file then the system can attempt to cure the file; (n) if the corrupted file is an independent (non-system) file, the system will delete the file. The percentages are user-set and changeable, either at installation or during normal use. The rules used to determine the rating are also modifiable and changeable dynamically, either by the user directly, or by the software accessing a server, for example, for updates, and downloading new/additional rules, modified old rules and the threat ratings associated with particular events, rules regarding new threats, and so on.

The process risk analysis is based on the security rating R. The security rating R varies from 'safe' to 'dangerous' (high) and calculated from 0 to a 100 percent. 0 is the safest level and 100 is the dangerous level. The security rating R is the number that could be viewed as a combination of a static rating and a dynamic rating.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiment of the present invention, examples of which are illustrated in the accompanying drawings.

In one embodiment of the invention, a system and method use the process risk analysis based on the security rating R. The security rating R varies from 'safe' to 'dangerous' (high) and calculated from 0 to 100 percent. 0 is the safest level and 100% is the most dangerous level. As an example, process is rated as 'safe' with a rating of 0-25%, a process rated as 'moderately dangerous' or 'suspicious' with a rating of 25-75% and in excess of 75% the process is rated as 'dangerous' (high). As will be appreciated, these numbers are exemplary and subject to change.

The security rating R is the number that could be divided in two parts: part one is static rating and part two is dynamic rating. Before the file execution invoked, the certain criteria of the file are analyzed, such name of the file, file size, file's location, compression, whether the file is packed, and whether the file was received from a CD-ROM, etc. These criteria determine the static rating S of the file.

After that an emulator is launched, and behavior of the executable file is emulated, producing different results for each event that took place during the initial emulation process. Each event is compared to the stored list of factors and a list of weights and to each event and process, an individual rating of safety or danger is assigned. The final rating is a sum of rating of all events and processes. The file is also subject to anti-virus scan through a signature analysis to detect a certain signatures that could only be attributed to a certain classes of viruses. This generates a dynamic rating D.

Every executed process gets assigned an initial security rating R comprising a static rating S and a dynamic rating D, $R=R(D,S)$.

Even if an initial security rating S is very low (e.g., from 0-25%), this rating could change anytime the process performs any 'suspicious' or 'dangerous' operations.

For example, the source of the file can change the rating of the process. The file that 'arrived' on the computer on a CD-ROM is much less likely to be infected than a file downloaded from the Internet. For the downloaded files, the source of the download, such as the URL, should preferably be considered. Whether the file is packed can also become a factor of risk, since malware files are often packed, in order to defeat the signature-based method of virus detection. The current location and/or path to the file can also be considered, in the event when some particular executable files install themselves in a particular directory, especially those directories that are infrequently used.

Another factor to consider is the size of the file. For example, a relatively small executable file executed for the first time is much more suspicious than a large executable file. This is due to the fact that transmission of large multi-megabyte infected files is frequently impractical, particularly from unsuspecting 'zombified' computers. If a zombified computer sends out very large infected files, it will not be able to send very many of them, if only due to hardware and bandwidth limitations. On the other hand, sending a large number of emails with a relatively small attachment is much more practical. Typical malware files sent out in this manner are on the order of 50-100 kilobytes (which, if packed, reduces to something on the order of 20-50 kilobytes). A file with the size less than 50 kilobytes could be considered as a candidate for being 'suspicious' file.

Another factor of risk that can be considered is whether a relatively small executable file is an installer file itself. In other words, the file, although small, triggers downloading a larger executable file from a web server or a file server on the Internet. Still another possible factor in the risk analysis is how the file was created, e.g., which process created this file, whether another file had been downloaded prior to the file being created on the disk—thus, knowing the URL of the downloaded file, the risk of the file that was just created can be assessed. Also, which directory/folder the file was created in (e.g., Temporary Internet Files is a higher risk than My Documents, root directory is higher risk than a lower-level directory) can be another factor, etc.

Another factor is whether or not a file is digitally signed and unsigned files, presumably, being more suspicious than signed ones.

File attributes, such as Archived and Read Only are used often, but attributes such as 'Hidden' or 'System' are used rarely and an indication for the executed file, that the file is suspicious. These attributes add, e.g., 5% to the process security rating.

As another example, if a process writes into a memory of other processes, or tries to handle a system service, the process assigned security rating as 'dangerous'. If the process copies itself anywhere, the process is assigned a 70% security rating. If the process creates executable files in folders such as WINDOWS, SYSTEM32, DRIVERS, the process is assigned a 100% security rating as an extremely dangerous process. Creation of Alternate Data Streams (ADS) in the executable files and folders causes a 100% rating to be assigned to the process. Creation of the certain files such as autorun.inf and runtime.sys causes a 'dangerous' rating to be assigned the process. Deletion and modification of system's files causes a 'dangerous' rating to be assigned to the process. Access to the files that contain passwords and other confidential information causes a 'dangerous' rating to be assigned to the process. Deletion of any files outside the program's folder causes at least 'suspicious' or 'moderately dangerous' rating to be assigned the process. Search for files EXE, DLL, SYS in the system's folders, causes a 'suspicious' or 'moderately dangerous' rating to be assigned to the process. Access to C:\WINDOWS\system32\dirvers\hosts, C:\boot.ini assigns a 'dangerous' rating to the process.

Registration of driver/service causes a 'suspicious' or 'moderately dangerous' rating to be assigned to the process. Deletion or manipulation of antivirus services or Firewall causes a 'dangerous' rating to be assigned to the process, for example, ChangeServiceConfig(BITS) or DeleteService ('McShield').

Access to the keys that store passwords causes a 'dangerous' rating to be assigned to the process, for example Software\Ghisler\Total Commander, Software\CoffeeCup Software\Internet\Profiles, Software\Mail.Ru\Agent\mra_logins, SOFTWARE\RIT\The Bat!, SOFTWARE\Far\Plugins\FTP\Hosts. Creation of the keys in the service registration area causes a 'suspicious' or 'moderately dangerous' rating to be assigned to the process. However, deletion of the existing keys causes 'dangerous' rating to be assigned to the process, for example deletion of the key \Registry\Machine\SYSTEM\ControlSet001\Services\SymEvent or \Registry\Machine\SYSTEM\ControlSet001\Services\SYMTDI.

The total security rating assigned to the process allows the system to analyze only the processes with 'dangerous' rating, such as, e.g., greater than 75%. For dangerous processes, the system can block access to the Internet, permit access to the Internet (optionally upon user approval) and restrict the usage of memory and other computer resources. The system, in one exemplary embodiment, uses a HIPS method, which limits availability of resources to potentially 'dangerous' processes. Host-based Intrusion Prevention Systems (HIPS) could be used with virtualization, for example, if the process tries to create a file in a system folder, the system would not allow the process to do it, and at the same time gives the process a higher rating and informs the process that the file has been created (even though in reality, the file was not created). This allows the system to search for more complex viruses.

The processes could be grouped into different groups. For example, if the process uses a system password, it could be placed in the group Password. If the process has access to the Internet, it could be placed in the group Internet. At the same time, each group has access only to certain resources. If the process is placed in the group Password, it should have only restricted access to the hardware resources, for example, it is forbidden to access the network through the network card.

There is a set of rules according to which the security rating is calculated. The rules are divided into the following exemplary categories: services and drivers, processes, system registry, files' operations, Internet, System Privileges, Rootkits, Defense from Antirootkits. Each rule is characterized by its own parameters such as Unique Identification, API function, Decision and whether it is acceptable to recognize the process as malware according to this rule.

The following are exemplary rules (note that in a real system, there are typically more rules than illustrated below:
Rule 'loading a driver of a malware throw a low level API ntdll.dll'
Rule identifier: 84
API function: loading a driver (NtLoadDriver)
Condition for argument 1: Includes as input <services/drivers of malware>
Condition for argument 2: *
Conditions for argument 3 ... N: *
Rating: single operation –100%, 2-3 operations –100%, >3 operations –100%
Based on this rule, can the process be regarded as malware? Yes
Rule 'Checking status of antivirus service'
Rule identifier: 8
API function: Checking the status of antivirus services (QueryServiceStatus)
Condition for argument 1: Includes as input <antivirus services>
Condition for argument 2: *
Conditions for argument 3 ... N: *
Rating: single operation –10%, 2-3 operations –30%, >3 operations –60%
Based on this rule, can the process be regarded as malware? No
Rule 'Manipulation of Autorun.inf file (creation)'
Rule identifier: 44
API function: Creation/opening of file (CreateFile)
Condition for argument 1: Has as input 'autorun.inf'
Condition for argument 2: *
Conditions for argument 3 ... N: *
Rating: single operation –100%, 2-3 operations –100%, >3 operations –100%
Based on this rule, can the process be regarded as malware? Yes
Rule 'start of service BITS (use of Downloader)'
Rule identifier: 18
API function: Start of service/driver (StartService)
Condition for argument 1: Includes BITS as input Condition for argument 2: *
Conditions for argument 3 ... N: *
Rating: single operation –90%, 2-3 operations –90%, >3 operations –90%
Based on this rule, can the process be regarded as malware? Yes
Group processes and services can be divided into the categories of antivirus processes, antivirus services, windows and elements of antivirus interfaces, system services, system processes and etc.

Figure 1:
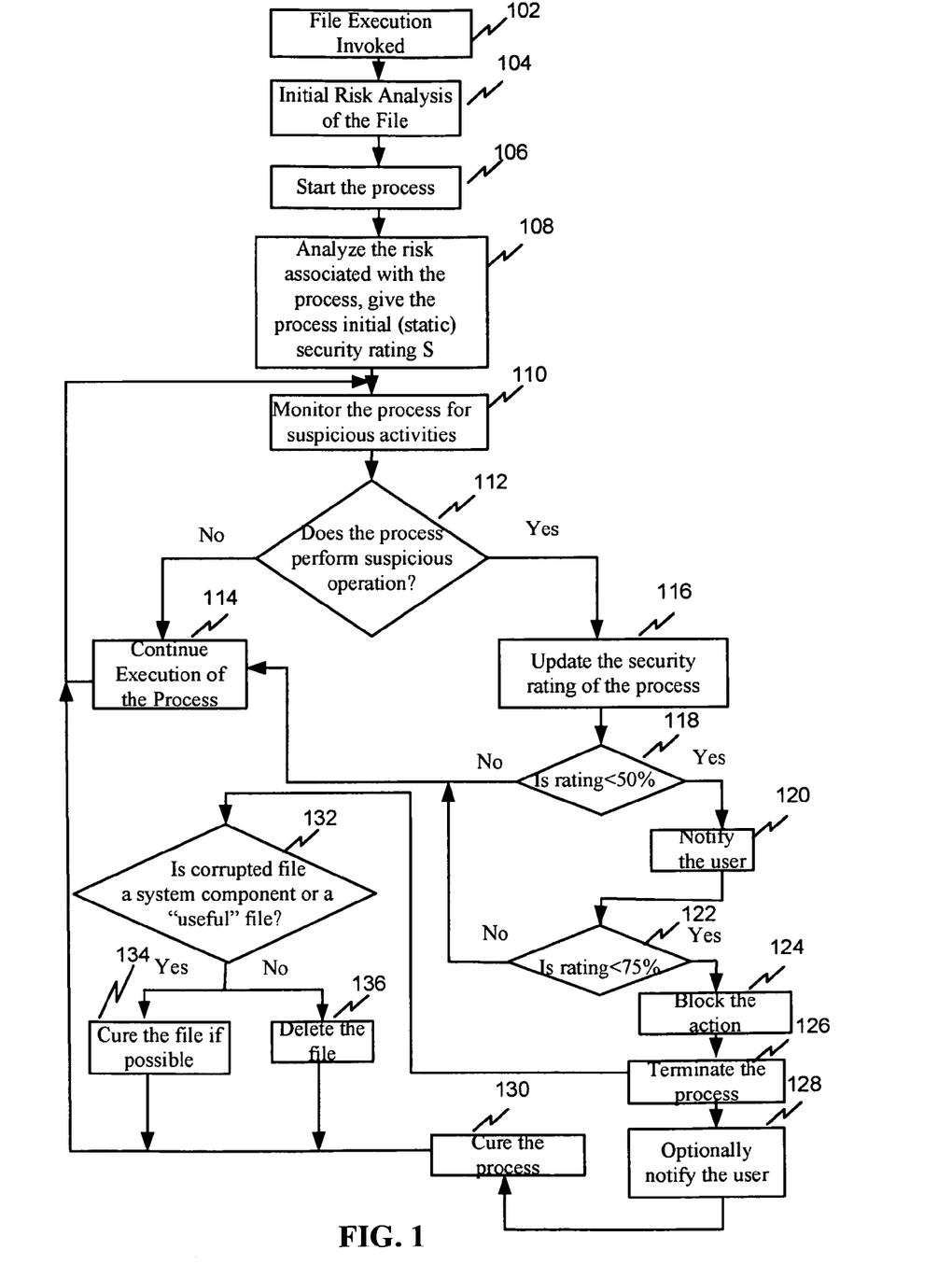
FIG. 1 illustrates a flow chart of a method of security rating of processes.

FIG. 1 illustrates a flowchart of a method of security rating of processes. As shown in FIG. 1, in step 102, execution of a file is first invoked. In step 104, risk analysis is performed, using various techniques to determine risks (for example, URL-based analysis is one risk factor, file size analysis is another factor, and so on). In step 106, the process starts. In step 108, the system analyzes the risk associated with the process, assigning the process the initial (static) security rating S. Even though the initial security rating S is very low (for example, from 0 to 25%), the overall rating could change every time the process performs any 'suspicious' or 'dangerous' operations. For example, when the process copies itself somewhere, or when the process creates executed files in folders WINDOWS, SYSTEM32, DRIVERS the security rating for the process immediately jumps to the dangerous level of, e.g., 75-100%. Other suspicious activities, or at least activities that can raise the rating can include, for example, access to system registry or performing network activity.

Groups of processes and services can be divided into such categories, such as antivirus processes, antivirus services, windows and elements of antivirus interfaces, system services, system processes, etc.

FIG. 1 illustrates a flowchart of a method of security rating of processes. As shown in FIG. 1, in step 102, execution of a file is first invoked. In step 104, risk analysis is performed, using various techniques to determine risks (for example, URL-based analysis is one risk factor, file size analysis is another factor, and so on). In step 106, the process starts. In step 108, the system analyzes the risk associated with the process, assigning the process initial security rating S. Even though the initial security rating S initially is very low (for example, from 0 to 25%), the initial rating S could change every time the process performs any 'suspicious' or 'dangerous' operations. For example, when the process copies itself somewhere, or when the process creates executed files in folders WINDOWS, SYSTEM32, DRIVERS the security rating for the process immediately jumps to the dangerous level of, e.g., 75-100%. Other suspicious activities, or at least activities that can raise the rating, can include, for example, whether the process writes into a memory allocated to other processes. Also, if the process tries to access password-protected files, or tries to start a service with a name identical to a system process name, or tries to start service with a name identical to an antivirus process, this can also be grounds for increasing the rating. Attempts by the process to handle or delete a system service, or to handle or delete an antivirus service, or to modify a system registry can also be grounds for increasing the rating. Similarly, attempts by the process to scan a network resource, to add a network resource, to request a system privilege, or to access a system kernel can also be grounds for increasing the rating.

The security rating can also be increased based on properties of a system call made by the process. Depending on the system call and its properties, one can change the risk level for the computer system. For example, the properties of the system call can include how many times system call was made by the process. Another example is matching of the system call parameter to, for example, a name of one of the system services or a name of a system registry key. The names of the critical system objects, names of system services, names of antivirus objects, etc. can be combined into various groups and for most system calls, there will be a corresponding group. Thus, if the process makes a system call with parameters matching those in group, the security rating of the process will increase.

As noted earlier, the process can be placed into a group, where all the processes in the group have the same permissions for related activities. If a process attempts an activity permitted to another group, but not to its group, this attempt would be blocked, and the process' rating can be raised. Examples of such activities are local network access, Internet access, file access, system registry access, password-related activities, activities that require system privileges and activities that require OS kernel privileges.

In step 110, the system continues to monitor the process for any suspicious activities. If the system detects any suspicious activities performed by the process (step 112), the system automatically updates the security rating of the process to D (step 116).

In step 118, if the security rating D is greater than 50%, the process is considered 'suspicious' or 'moderately dangerous'. The system will notify the user (step 120) and continue to execute the process (step 114), unless the user instructs the system otherwise.

In step 122, if the security rating D is greater than 75%, the process is considered 'dangerous', which indicates that a malware is present, or is likely to be present, then, in step 124, execution of the file is blocked, and the process terminates, in step 126. In step 128, the user may be optionally notified of the problem. The system may try to cure the process in step 130, then, if the process is cured, the process execution is permitted in step 114. The process could be cured, for example, by downloading from the Internet and replacing the damaged code or restoring the file from a trusted backup, and relaunching the process.

Once the system terminates the process in step 128, the system may have to deal with the corrupted file. If the corrupted file is a system component or a 'useful' file (an example of 'useful' file could be any user application such as Microsoft Word or Microsoft Excel) (see step 132), then the system can try to cure the file, the same way it cured the process, and the execution of the file will be continued (step 114). However, if the corrupted file is an independent executable file, the system will try to cure it, and, if impossible, quarantine or delete the file and continue to monitor the process for suspicious activities (step 110).

Figure 2:
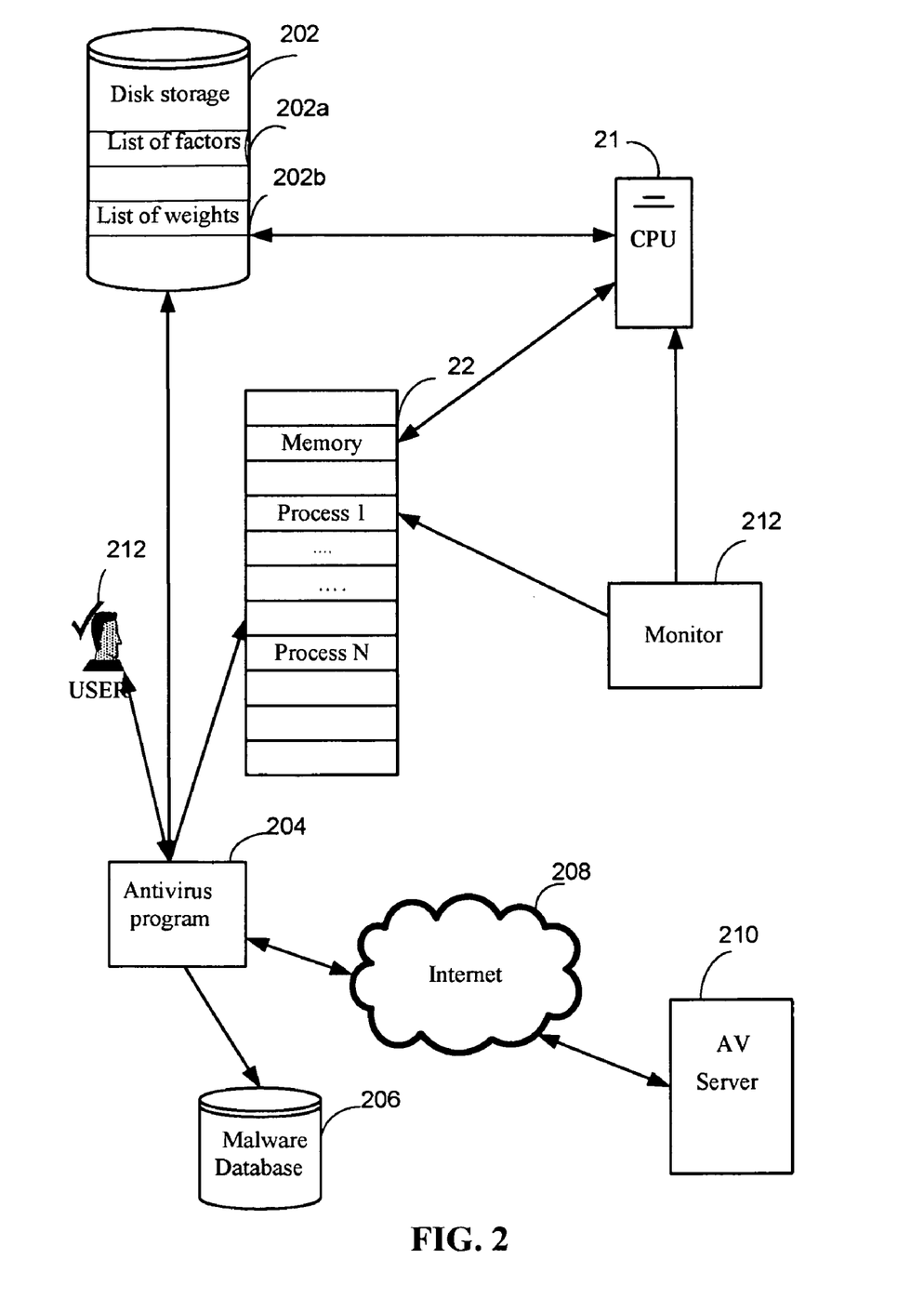
FIG. 2 illustrates a system for security rating of processes.

FIG. 2 illustrates a system for security rating of processes. Memory 22 stores multiple processes. Each process is characterized by certain attributes that are compared to the stored list of factors 202a and list of weights 202b stored on the disk storage unit 202 and process is assigned individual rating of safety or danger. The system, using an antivirus program 204, assigns an initial security rating S to the process. The monitor 212 checks the process for any suspicious activities. As an option, the monitor 212 can be integrated into the antivirus program 204. If monitor 212 detects the process performing any suspicious activities, then the system updates the security rating of the process to D again by comparing the process's attributes and characteristics to the list of factors 202a and list of weights 202b stored on the disk storage unit 202. If D is greater than, e.g., 50%, the system will notify the user 212 and continue to execute the process on the CPU 21. If D is greater than 75%, the process is considered dangerous by the antivirus program 204, which indicates that there is a strong probability of malware, from the malware database 206 and that the process is corrupted. The system will therefore block the action and terminate the process and/or block the process' access to computer resources, such as memory, disk, network card, etc. The system, using the antivirus program 204 will try, if possible, to cure the process by downloading clean code via Internet 208 or restoring the file from a trusted backup, and relaunching the process. The system will also try to cure the corrupted file in a similar way it tried to cure the corrupted process in order to continue its execution. It will be understood that the threshold percentage, as discussed above, is exemplary only.

Figure 3:
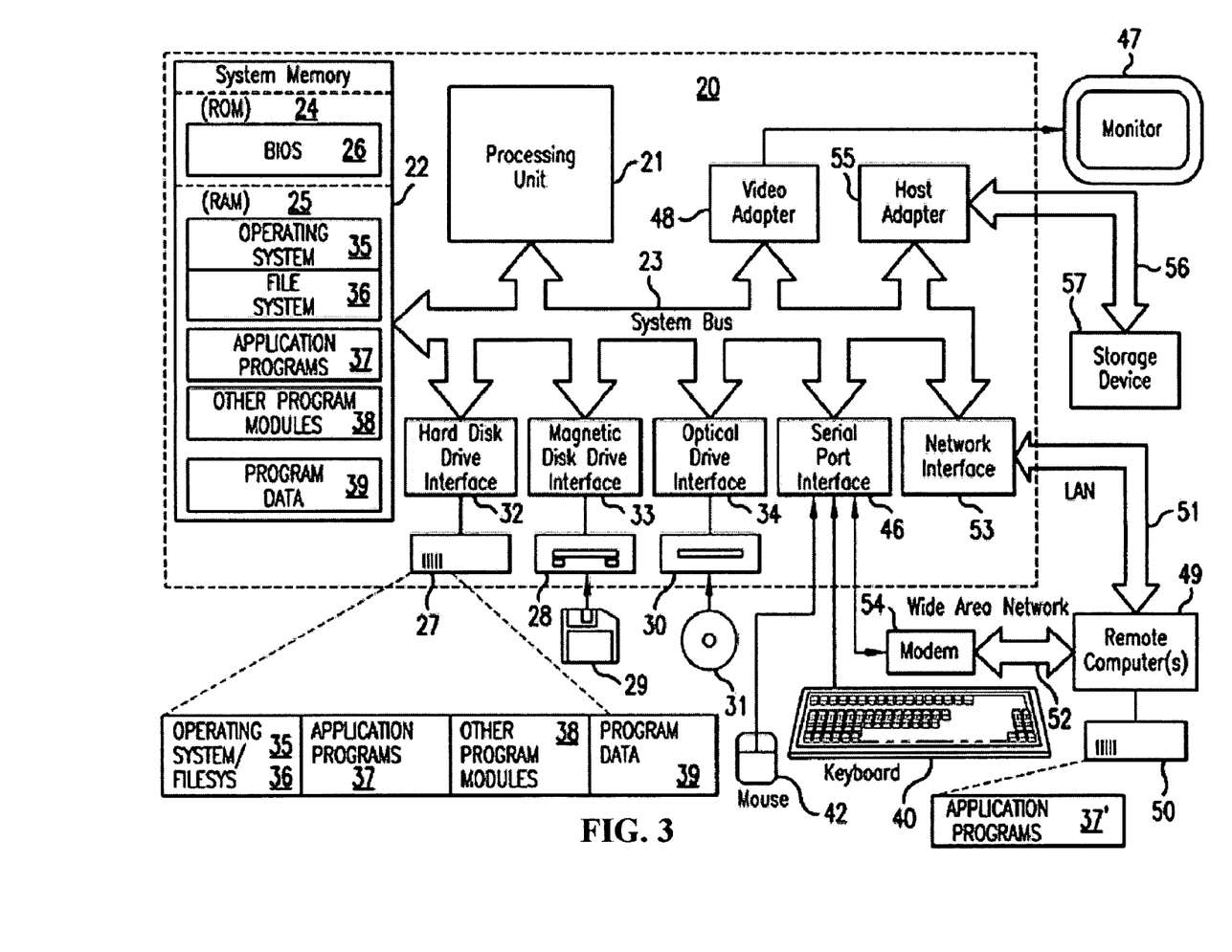
FIG. 3 illustrates an example of a computer system used for implementation of the proposed method.

With reference to FIG. 3, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules/subroutines, where each of the steps described above can be a separate module, or several steps can be aggregated into a single module, and other data for the personal computer 20. Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 coupled to the system bus, and can be connected by other interfaces, such as a parallel port, game port or universal serial bus (USB). A monitor 47 or some other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be represented by another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are common in offices, enterprise-wide computer networks, Intranets and the Internet.

When used in a LAN networking environment, the personal computer 20 is connected to the local network 51 through a network interface or adapter 53. When in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus can be achieved. It should also be appreciated that various modifications, adaptations and alternative embodiments thereof may be made within the scope and spirit of the present invention. The invention is further defined by the following claims.

What is claimed is:

1. A method for security rating of a process, the method comprising:
   (a) detecting an attempt to execute a file on a computer;
   (b) performing an initial risk assessment of the file;
   (c) if the initial security rating is higher than a predetermined value, notifying a user;
   (d) starting the process based on code in the file;
   (e) monitoring the process for the suspicious activities;
   (f) updating the security rating of the process when the process attempts to perform the suspicious activity;
   (g) if the updated security rating exceeds a first threshold, notifying a user and continuing execution of the process; and
   (h) if the updated security rating exceeds a second threshold, blocking the process' access to computer resources.

2. The method of claim 1, further comprising terminating the process after step (h).

3. The method of claim 1, further comprising curing the process and then resuming execution of the process.

4. The method of claim 1, wherein, if the corrupted file is a system component, curing the file and then resuming execution of the file.

5. The method of claim 1, wherein, if the corrupted file is an independent (non-system) executable file, deleting the executable file.

6. The method of claim 1, wherein, if the corrupted file is an independent (non-system) executable file, quarantining the executable file.

7. The method of claim 1, wherein, if the corrupted file is an independent (non-system) executable file, curing the executable file.

8. The method of claim 1, wherein the security rating comprises a static rating and a dynamic rating.

9. The method of claim 8, wherein the static rating is based on any of name of the file, file size, file location, compression and/or static properties of the file.

10. The method of claim 8, wherein the dynamic rating is based on the results of the file emulation process.

11. The method of claim 1, wherein the risk assessment of the file is based on any of file size, file format, file structure, whether the file is digitally signed, whether the file is a download utility, whether the file is packed, file source, and whether the file was received from a CD-ROM.

12. The method of claim 1, wherein the risk assessment is based on a URL from which the file was received.

13. The method of claim 1, wherein the risk assessment is based on file origin.

14. The method of claim 1, wherein the risk assessment is based on file path.

15. The method of claim 1, wherein the risk assessment of the process is based on any of the following:
- whether the process tries to write into a memory allocated to other processes;
- whether the process tries to access password-protected files;
- whether the process tries to start service with a name identical to a system process name;
- whether the process tries to start service with a name identical to an antivirus process;
- whether the process tries to handle or delete a system service;
- whether the process tries to handle or delete an antivirus service;
- whether the process tries to modify a system registry;
- whether the process tries to scan a network resource;
- whether the process tries to add a network resource;
- whether the process tries to request a system privilege;
- whether process tries to access a system kernel; and
- properties of a system call made by the process.

16. The method of claim 1, further comprising:
- placing the process into a group having permissions for related activities; and
- blocking activities by the process if those activities require permissions for a different group.

17. The method of claim 16, wherein the activities related to the group can include any of:
- local network access;
- Internet access;
- file access;
- system registry access;
- password-related activities;
- activities that require system privileges; and
- activities that require OS kernel privileges.

18. The method of claim 1, wherein, if the process security rating is high, the process will have limited access to computer resources.

19. A system for security rating of a process, the system comprising:
- a processor;
- memory coupled to the processor;
- a plurality of risk analysis factors maintained by the system;
- a plurality of weights, maintained by the system, corresponding to the risk analysis factors;
- an antivirus program loaded into the memory that assigns an initial security rating based on the risk assessment by comparison of file attributes with the risk analysis factors and weights, and notifies a user if the initial security rating is higher than a predetermined value;
- a process executing on the processor based on code in the file;
- wherein the antivirus program continuously monitors the processes for suspicious activities and updates the security rating of the process when the process attempts to perform a suspicious activity;
- wherein the antivirus program notifies the user and continues execution of the process if the updated security rating exceeds a first threshold; and
- wherein the antivirus program blocks the process access to computer resources if the updated security rating exceeds a second threshold.

* * * * *